US009342467B1

(12) United States Patent
McGrath et al.

(10) Patent No.: US 9,342,467 B1
(45) Date of Patent: May 17, 2016

(54) VIRTUAL WINDOW SYSTEM (71) Applicants: Frederick Thomas McGrath, Saint Paul, MN (US); Craig Jordan Blacklock, Moose Lake, MN (US)

(72) Inventors: Frederick Thomas McGrath, Saint Paul, MN (US); Craig Jordan Blacklock, Moose Lake, MN (US)

( * ) Notice: Subject to any disclaimer, the term of this patent is extended or adjusted under 35 U.S.C. 154(b) by 353 days.

(21) Appl. No.: 14/033,454

(22) Filed: Sep. 21, 2013

Related U.S. Application Data (60) Provisional application No. 61/847,137, filed on Jul. 17, 2013.

(51) Int. Cl.
*G06F 13/00* (2006.01)
*G09F 19/22* (2006.01)

(52) U.S. Cl.
CPC ............... *G06F 13/00* (2013.01); *G09F 19/22* (2013.01); *G09G 2340/12* (2013.01)

(58) Field of Classification Search
None
See application file for complete search history.

(56) References Cited

U.S. PATENT DOCUMENTS

| | | | |
|---|---|---|---|
| 2,814,895 A | 12/1957 | Flam | |
| 3,447,274 A | 6/1969 | Davidson | |
| 5,251,392 A | 10/1993 | McManigal | |
| 5,426,879 A | 6/1995 | Hecker | |
| 6,144,417 A | 11/2000 | Yanagisawa | |
| D465,489 S | 11/2002 | Farber | |
| 8,259,178 B2 | 9/2012 | Basso et al. | |
| D668,784 S | 10/2012 | Myles | |
| 2003/0201957 A1 | 10/2003 | Mix et al. | |
| 2005/0044511 A1 | 2/2005 | Jong | |
| 2007/0166671 A1* | 7/2007 | Walter | G09B 5/00 434/98 |
| 2008/0088624 A1 | 4/2008 | Long et al. | |
| 2009/0051545 A1* | 2/2009 | Koblasz | G08B 21/245 340/573.1 |
| 2009/0051699 A1 | 2/2009 | Posa et al. | |
| 2009/0273302 A1* | 11/2009 | Staats | E06B 7/28 315/297 |
| 2010/0271394 A1 | 10/2010 | Howard | |

OTHER PUBLICATIONS

Radikovic, "Artificial Window View of Nature", CHI EA '05 Extended Abstracts on Human Factors in Computing Systems, pp. 1993-1996, ACM New York, NY, USA 2005.*

* cited by examiner

*Primary Examiner* — Maurice L McDowell, Jr.
(74) *Attorney, Agent, or Firm* — Berggren Law Offices, LLC; William B. Berggren; Stephen F. Wolf (57) ABSTRACT

A virtual window system that allows a viewer to believe that he or she is looking at an actual window when actually looking at our system attached to a wall. The virtual window system comprises four elements: a processor, a computer, a monitor, and a frame. The processor is a conventional device for controlling information and lighting to achieve specified results. The computer-readable storage medium in communication with the processor is configured to transmit a digital image sequence to the monitor. The monitor is in communication with the computer-readable storage medium and the processor and is configured to display the digital image sequence. The frame surrounds the monitor with a back, a front, a top, and sides, and includes at least one light source configured to transmit light into an indoor environment to simulate an actual window.

8 Claims, 6 Drawing Sheets

VIRTUAL WINDOW SYSTEM

BACKGROUND OF THE INVENTION

There is a need for a virtual window that is a more complete sensory enhancement system than currently taught.

Current virtual windows provide some form of a digital image to simulate a window. Some provide pleasing scenes from other locations such as, for example, tropical beaches. Some provide some sense of motion through a digital image relay or recording. Some provide additional elements such as smells to augment the illusion of an actual window.

There is still a need for a virtual window that causes the viewer to experience more of a suspension of disbelief that the observer is viewing an actual window.

SUMMARY OF THE INVENTION

We have invented a virtual window system that allows a viewer to believe that he or she is looking at an actual window when actually looking at our system attached to a wall. The system has a system aspect and a method aspect. The virtual window system comprises four elements: a processor, a computer, a monitor, and a frame. The processor is a conventional device for controlling information and lighting to achieve specified results. The computer-readable storage medium in communication with the processor is configured to transmit a digital image sequence to the monitor. The monitor is in communication with the computer-readable storage medium and the processor and is configured to display the digital image sequence. The frame surrounds the monitor with a back, a front, a top, and sides, and includes at least one light source configured to transmit light into an indoor environment to simulate an actual window.

We have also invented method of calming feelings in a person staying in a room without any windows comprising two steps. The first step is affixing at least one virtual window system on a wall in a windowless room, the system comprising the virtual window system discussed above. The second step is displaying a digital image sequence having at least one scene consisting of at least a nature scene depicting moving water or a nature scene depicting gently moving vegetation.

Our system suspends the disbelief of an occupant in the windowless room that the room has no windows. It is known that an occupant has a calmer mental state when in a room that has a window over in a room that is windowless. The room with a window is perceived as less confining. Hospital patients appear to heal faster when they have rooms with windows. In addition, it is believed that occupants mentally fare even better when the scene is peaceful. Examples of such peaceful scenes include, for example, a moving digital image comprises a nature scene from a group consisting of trees, water, vegetation, or savannahs. However, that benefit is significantly enhanced when our virtual window system is used because our virtual window appears to be an actual window to a greater degree than is currently taught with current virtual window designs.

BRIEF DESCRIPTION OF THE DRAWINGS

One or more features or forms of the invention are described in the accompanying drawings. The drawings are described briefly below.

DETAILED DESCRIPTION

Virtual windows have been taught before. In all cases occupants in a windowless room having such a virtual window realize that the virtual window is not a real window. Because the occupant's disbelief is tangible, the stated advantages to the mental state of the occupant are significantly diminished. The occupant knows that he or she is looking at little more than a fancy television monitor with a selected content. Typically, they consist of monitors placed in holes in walls or flat screen monitors hung on a wall surface. They may include projection techniques to simulate depth. U.S. Pat. No. 2,814,895 discloses a picture in a frame simulating a porthole of a ship. U.S. Pat. No. 3,447,274 discloses modular pictures that form part of a larger scene when displayed in a frame. U.S. Pat. No. 5,251,392 discloses an artificial window comprising a framed picture illuminated by a front light shining on the picture. U.S. Pat. No. 5,426,879 discloses a back-lit picture in a window frame. U.S. Pat. No. 6,144,417 discloses a wall-mounted frame with a recessed video display screen to create a 3D effect and protect the image from extraneous light in the enclosed room and a plurality of cameras viewing different angles to provide a variable display as a person in a room moves about. U.S. Pat. No. D465,489 discloses a simulated window with a video screen encased with a window curtain and valance. U.S. Patent No. 2003/0201957 discloses a video display encases in a frame to simulate a fireplace or other household simulations. U.S. Patent No. 2005/0044511 discloses a video display in a window frame that is fed images by a camera transmitting from another outdoor scene. U.S. Patent No. 2008/0088624 discloses a flat screen static display encased within a frame a constructed to simulate a parallax and field of view shift to convey depth similar to viewing a scene out of an actual window. U.S. Patent No. 2009/0051699 a wall mounted display having a backside and a camera mounted outside the room panning the outdoors scene in time with the movement of a person in the room to display a scene as a function of the viewer's position. U.S. Patent No. 2010/0271394 discloses a system of merging virtual reality sensory detail from a remote location into a room environment at a local site similar to blue screen techniques used in movie making. U.S. Pat. No. 8,259,178 discloses a system of merging different external scenes from a remote location into a room environment at a local site to synthesize a virtual window similar to blue screen techniques used in movie making. U.S. Pat. No. D668,784 discloses a window pane assembly designed to fit over a picture to convey a window in a windowless room.

The effective distinction of our invention from those discussed above is that our system transmits light into the windowless enclosure to enhance the illustration that the virtual window of the invention is real. Thus all of benefits to the mental state of the occupant that have been described above become significantly more enhanced.

As discussed above, we have invented a virtual window system that allows a viewer to believe that he or she is looking at an actual window when actually looking at our system attached to a wall, typically in a windowless enclosure. The invention has a system aspect and a method aspect. The virtual window system aspect comprises four elements: a processor, a computer, a monitor, and a frame.

The processor is a conventional device for controlling information and lighting to achieve specified results. This element is configures to control the display of information to achieve different desired sequences showing outdoor scenes. Some embodiments also have processors configures to merge other images such as, for example, simulated parts of window frames or parts of 3D objects as discussed below. The processor is also configures to coordinate the lighting effects to specified parameters discussed below. In one embodiment, the processor is a mini HD DVD player mounted on rear of monitor. In one embodiment, the processor is in communication with a remote control unit.

The computer-readable storage medium in communication with the processor is configured to transmit a digital image sequence to the monitor. One digital image sequence comprises scenes that convey a calming mental state. Such scenes include, for example, those of water, trees, vegetation, flowers, and savannahs that may not be available at the location of the enclosure containing the virtual window system of the invention. These digital image sequences may be of actual sequences from remote locations or stored sequences. Another sequence may be those that convey, for example, simulated parts of window frames or parts of 3D objects as discussed below. In some embodiments, more than one digital image sequence may be available for communication with the monitor. In some embodiments, the digital image sequence is the same image or a series of varying images. In some embodiments, the computer readable storage medium is also configured to receive the digital image sequence through online streaming, by cable, telecommunication, or by delivery through closed-system telecommunication. In some embodiments, the computer-readable storage medium configured to play a digital image sequence is further configured to mimic time changes, such as, for example seasonal changes or time of day changes. In some embodiments, the computer-readable storage medium configured to play a digital image sequence is able to be configured to display other information or programming such as, for example, informational text regarding upcoming events, news flashes, and other information relevant to a particular occupant such as a home owner or hospital patient, or a general audience such as those waiting for a train or bus. In some embodiments, more than one system may be used in a windowless enclosure. In some of these embodiments, multiple images can be integrated to form a larger image or the views may show appropriate orientation such as, for example, North, East, South, and West.

The monitor is in communication with the computer-readable storage medium and the processor and is configured to display the digital image sequence. The monitor is generally larger than the window frame that typically covers the edges of the monitor. Also the monitor comes with wall mounting hardware to affix the virtual window with the monitor to the wall of a windowless enclosure. In one embodiment, the monitor is an ultra-thin commercial LED/LCD high-definition video monitor. In one embodiment, the monitor is a flat screen television set having a thin depth.

The frame surrounds the monitor with a back, a front, a top, and sides, and includes at least one light source configured to transmit light into an indoor environment to simulate an actual window. In one embodiment of the invention, the frame is that of a conventional window with glass that is configured to fit over and encompass the monitor. Such a window may have a single sheet of glass or may have sliding panels or other construction used by windows today. In some embodiments, the back of the frame is the back of side of the frame that extends toward the wall of the windowless enclosure to encompass the monitor. In some embodiments, the back of the frame is an element that extends at least partially behind the monitor and has an attaching element to affix the virtual window to the wall of the enclosure. In some embodiments, the frame contains a valance that extends outward from the frame portion that encases the monitor. In one embodiment, the frame includes at least a curtain or a valance or both. In some embodiments the frame comprises at least parts of 3D objects that are displaced in front of the monitor. In some embodiments, the frame further comprises a pivotal mount affixed to the monitor to allow it to be moved over a range from horizontal to vertical depending on such factors as, for example, the information being conveyed, the contour of the enclosed room, and the occupant. In some embodiments, the back of the frame comprises a pliable surface that is able to intimately conform to a contoured surface of a wall or have sides that are able to intimately conform to the contoured surface. In some embodiments, the frame includes trim that crosses over the face of the monitor in, for example, a grid pattern.

In some embodiments, the frame includes a realistic-looking faux window structure including the usual components such as, for example, frame, sash, rails, head, sill, and window panes designed to fit over the wall-mounted monitor encasing the monitor completely and seated to the wall. The top and bottom of the frame are designed to allow airflow for venting heat and allow aroma vapor to escape. When the faux window unit assembly is connected to the underlying monitor and combined with a light source configures as described below, it provides an illusion so realistic it looks exactly like an actual window installed in the wall and the "HD video view" illusion is so effective as to evoke one's "suspension of disbelief" and the experienced perception of the "view" is actually representative of the exterior reality.

The frame may be affixed to a wall of an enclosure in various ways. In some embodiments, the virtual window system is attached to the wall like a picture. In some embodiments it uses a wall mounting mechanism and trim that eliminates space between the monitor and wall to make the space look like the window trim goes through wall as with an actual window. In some embodiments, the virtual window is attached to a wall with a rotating mounting device, allowing for either vertical or horizontal programming of the digital image sequence. In some embodiments, the frame comprises a wall mounting mechanism and trim that substantially eliminates the space behind monitor and wall, making it look like window trim goes through to the wall.

The frame also includes at least one light source configured to transmit light into an indoor environment to simulate an actual window. It is this light source and the effects that are generated that are the primary source of the creation of a virtual window that suspends the normal disbelief of an occupant that the virtual window of the invention is an actual window. This suspension of disbelief combined with soothing digital image sequences result in a calming effect to the mental state of the occupant or occupants.

The configured light source has various forms and functions designed to cause a suspension of disbelief that the virtual window is real. The configured light source may be an LED, an incandescent source, or other that conveys illumination in to the windowless room. In one embodiment, the configured light source is at least one source that projects light into the room to create shadows. Discussion will focus on light sources hidden in valances of window frames or behind curtains of some frames but it is understood that the light may be in other locations where the source is hidden from view so that the light is perceived as being similar to sunlight shining into the enclosure through an actual window.

The illumination emanating from light sources hidden in the valance, projecting into the room could be modified in a number of ways to simulate natural light entering a room, such as the diffused light of a cloudy day, or sunlight passing through wind-blown tree branches, or light reflecting off of waves on a lake. Examples of simple mechanisms to achieve these effects include, but are not limited to, diffusers, layers of fixed and rotating lenses, layers of fixed and rotating apertures, or any combination of these. This illumination (either in the source or through external modification) can also be altered in hue and intensity. The hue and intensity could be programmed to change to match the real or simulated time of day, or to match a particular program playing on the monitor. These lights and light modifiers may also be wirelessly coordinated with other, similar elements throughout the space, but outside the physical window, to enhance the desired effect.

Figure 1:
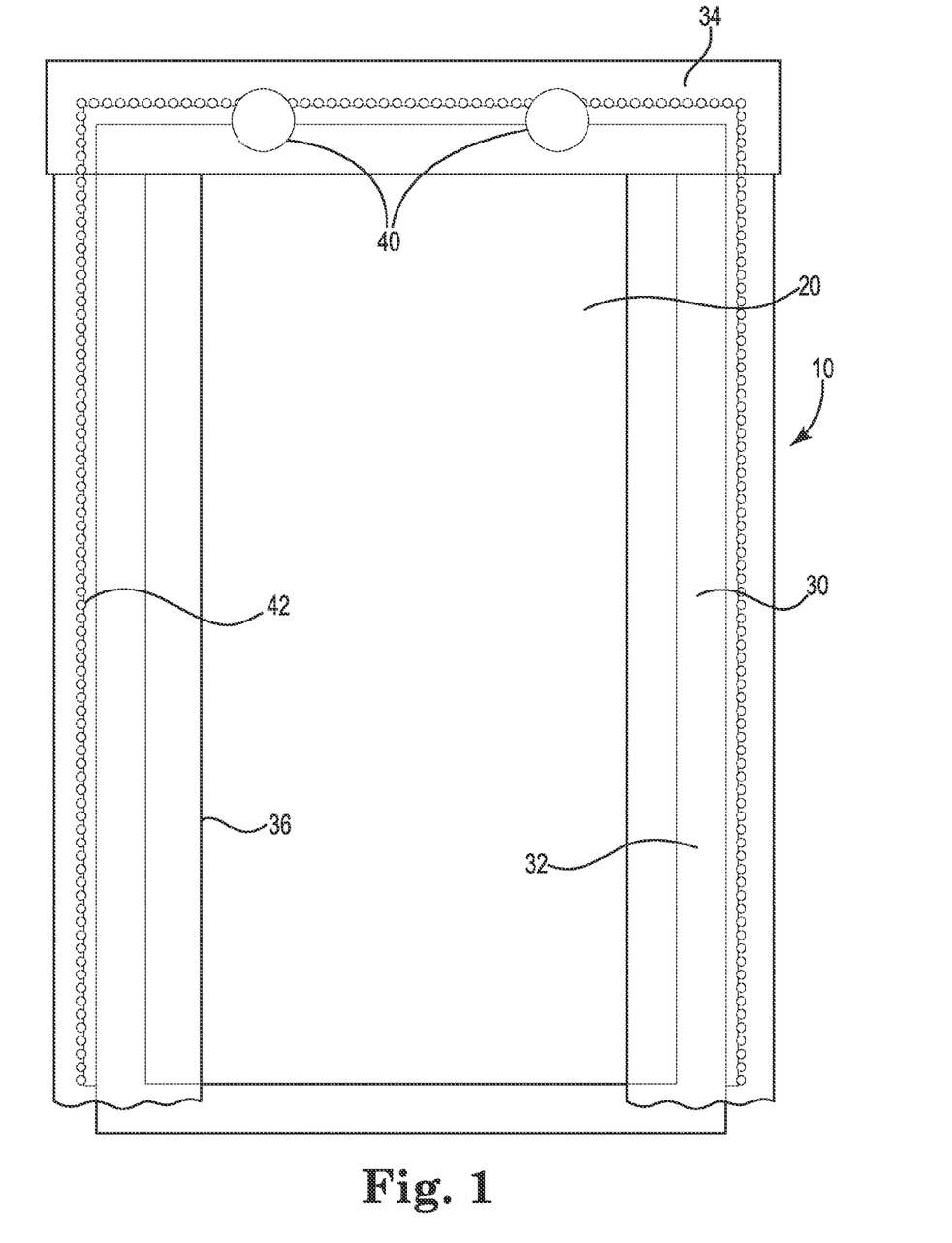
FIG. 1 is an illustration of the front view of a frame of an embodiment of the virtual window system with lights hidden to create shadows.

FIG. 1 is an illustration of the front view of a frame of an embodiment of the virtual window system with lights hidden to create shadows as it projects out into the enclosure. The system (10) includes a monitor (20) surrounded by a frame (30) resembling a window trim (32) and a window valance (34). Frame also includes curtains (36) that cover the vertical edges of the monitor. Light sources (40) are hidden in valance 34 and shine a light onto the floor of the enclosure through light modifiers to simulate the light effects of sunlight as discussed above. Additional light sources (42) behind curtain 36 are for creating light shining inward through at least one curtain onto a wall and then reflected from the wall out into the environment or light through curtains. The processor and storage medium that handle digital image sequences are not shown.

The illumination may be shown downward between a pane of glass in the frame and the monitor, and angling outward into the enclosure. The angle replicates sunlight during a particular part of the day. In one embodiment, the angle can vary over time. In one embodiment, the space between the glass and the monitor is about 3-4 inches. In one embodiment, the space is more than 4 inches. The glass may be one pane or multiple panes such as, for example, 2, 4, or 6 with wooden trim, although the trim also may be plastic or metal. In this illumination embodiment, the light shines on the trim, backlighting it, and making it seem like light is coming from outside. This illumination also creates a shadow pattern on the floor, showing the trim grid in shadow and panes in light.

Figure 2:
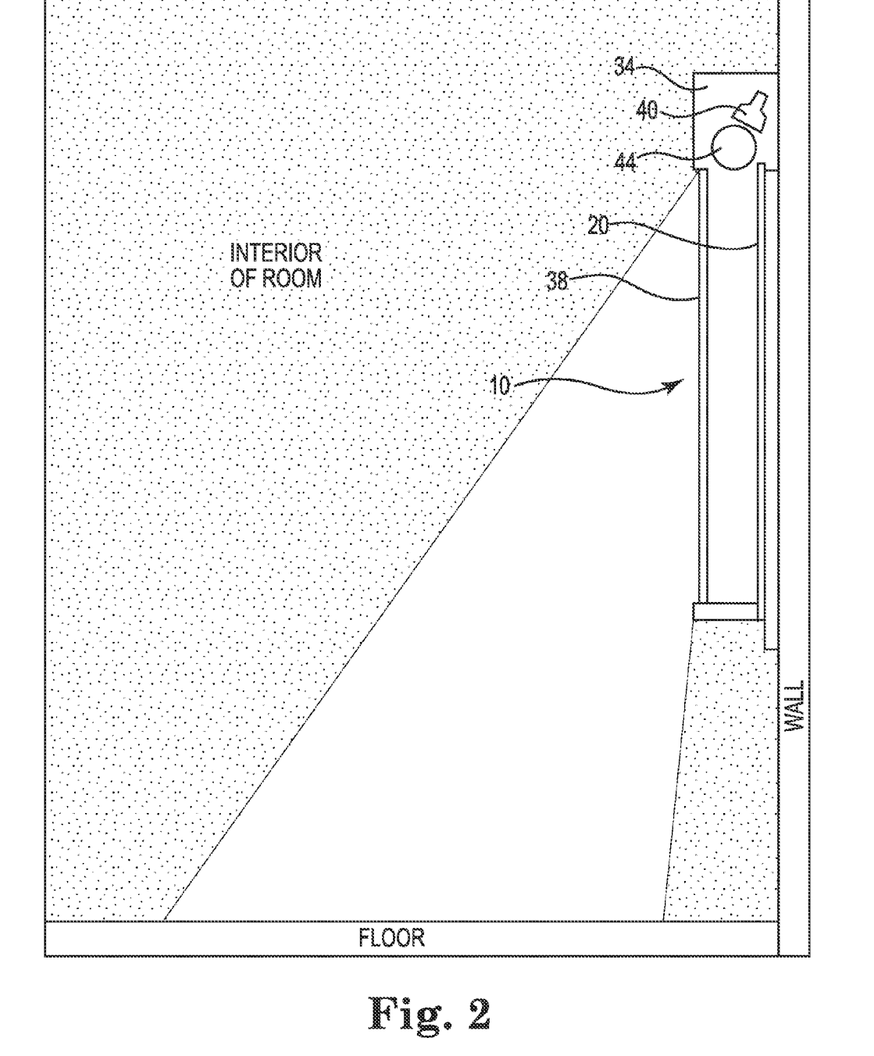
FIG. 2 is an illustration of the side view of a frame of an embodiment of the virtual window system with lights hidden to create shadows.

FIG. 2 is an illustration of the side view of a frame of an embodiment of the virtual window system with lights hidden to create shadows on the floor of the enclosure as just described. Similar numbering is used for similar elements previously shown. System 10 includes monitor 20 affixed to a wall of the enclosure and surrounded by a frame that includes window valance 34 and a window with panes (38). Light sources 40 are hidden in valance 34 and shine through a light modifies (44) through the window with pane and onto the floor of the enclosure to cast shadows of the windowpanes onto the floor. The processor and storage medium that handle digital image sequences are not shown.

The system may also comprise 3D objects or at least parts of 3D objects. These typically are placed in from of the monitor but may be placed in from of the frame. They are illuminated from behind and/or above, giving a realistic appearance of light coming through the window. The 3D object in front of the monitor serves as an object for light to illuminate from behind and above, giving a realistic impression as to light coming through window. The 3D object also serves as a 3D element in front of screen, providing a sense of depth to the whole window and more of a 3D feeling. In one embodiment, the configured light source comprises a light shining on the 3D object creating shadows. In one embodiment the 3D object is only part of an actual object that is spatially synchronized with the other part to the object, in turn is a digital image in the foreground of a digital image sequence. In one embodiment, the digital part of the 3D image is the entire digital image sequence that may vary in shadow effect simulating time of day or be stationary. In some embodiments, the 3D element is trim on the outside of the monitor and the digital element is from a group consisting of an open window, a railing, shutters, separate partial 3D object. In some embodiments, the 3D image comprises an image of an open window superimposed over the digital image sequence.

Figure 3:
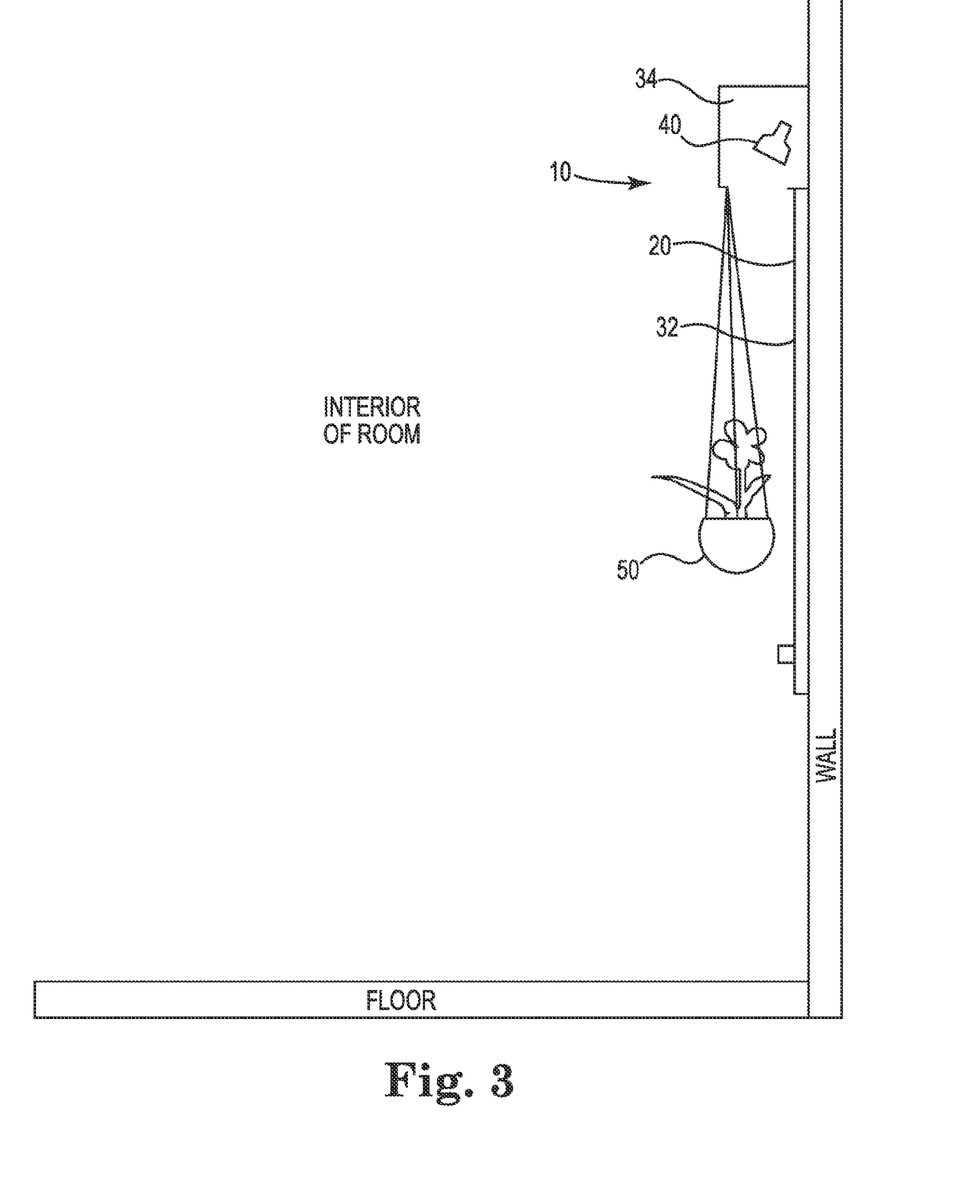
FIG. 3 is an illustration of the hidden lights with a 3D object.

FIG. 3-6 are diagrams and illustrations of various aspects of some embodiments using 3D objects. FIG. 3 is an illustration of the hidden lights with a 3D object. It is a side view of a virtual window with the frame not including a pane of glass and a 3D object is suspended from the frame valance. System 10 includes monitor 20 affixed to a wall of the windowless enclosure and surrounded by frame window trim 32 and frame window valance 34. Light 40 is hidden by valance 34 and shines illumination downward onto a 3D object (50) that is suspended from valance 34 top create a shadow of the 3D object on the floor of the interior of the room.

Figure 4:
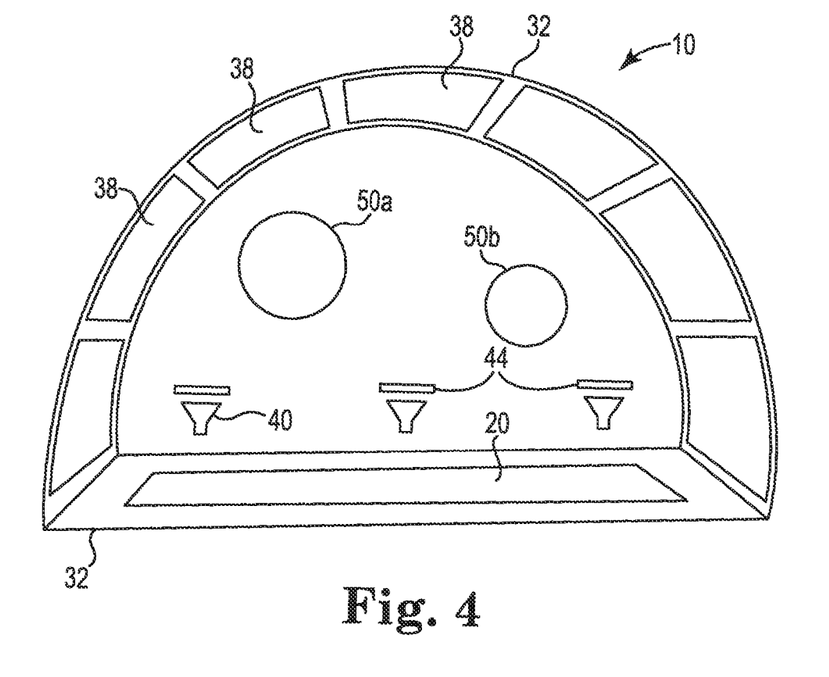
FIG. 4 is a top view of an embodiment of the virtual window with two 3D objects.

FIG. 4 is a top view of an embodiment of the virtual window with two 3D objects. System 10 comprises monitor 20 and frame 30 covering the edge of the monitor. Frame 30 also consists of panels of glass 38 held in trim 32 forming an arc with some of the panels able to slide or move outward. Two 3D objects are displayed, one, 50a, suspended from the top of the frame and the other, 50b, on a stand on the floor of the frame.

Figure 5:
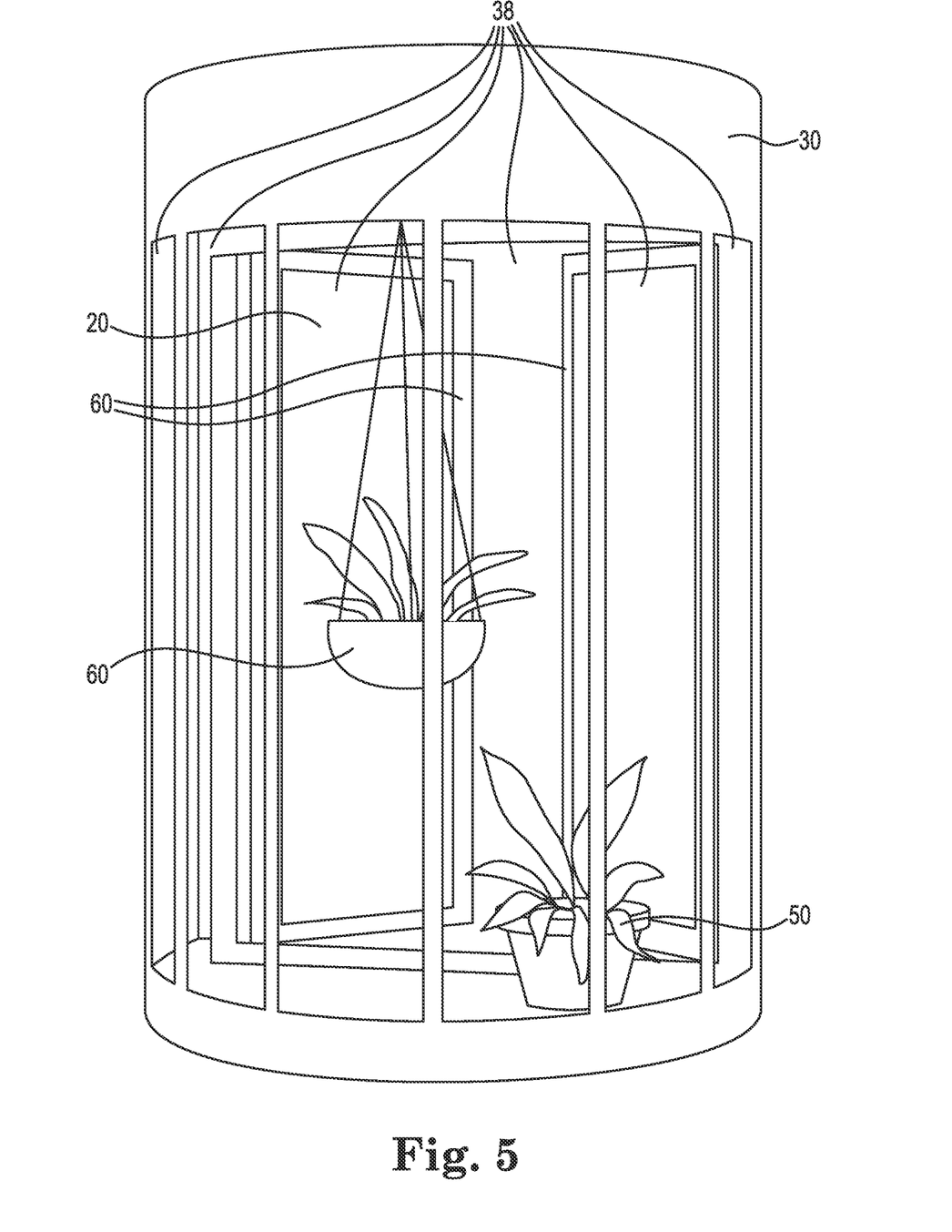
FIG. 5 is a front view of an embodiment of the virtual window with a 3D object and a stationary digital image.

FIG. 5 is a front view of an embodiment of the virtual window with a 3D object and a stationary digital image. System 10 comprises monitor 20 displaying a digital image sequence (60) of a window frame opening outside and a 3D object suspended from the top of frame. Actual 3D object 50 resides on the frame floor. Monitor 20 is enclosed by multiple vertical panels of glass 38 held by window trim 32. Light source 40 that shines down from inside top of frame 30 is not shown.

Figure 6:
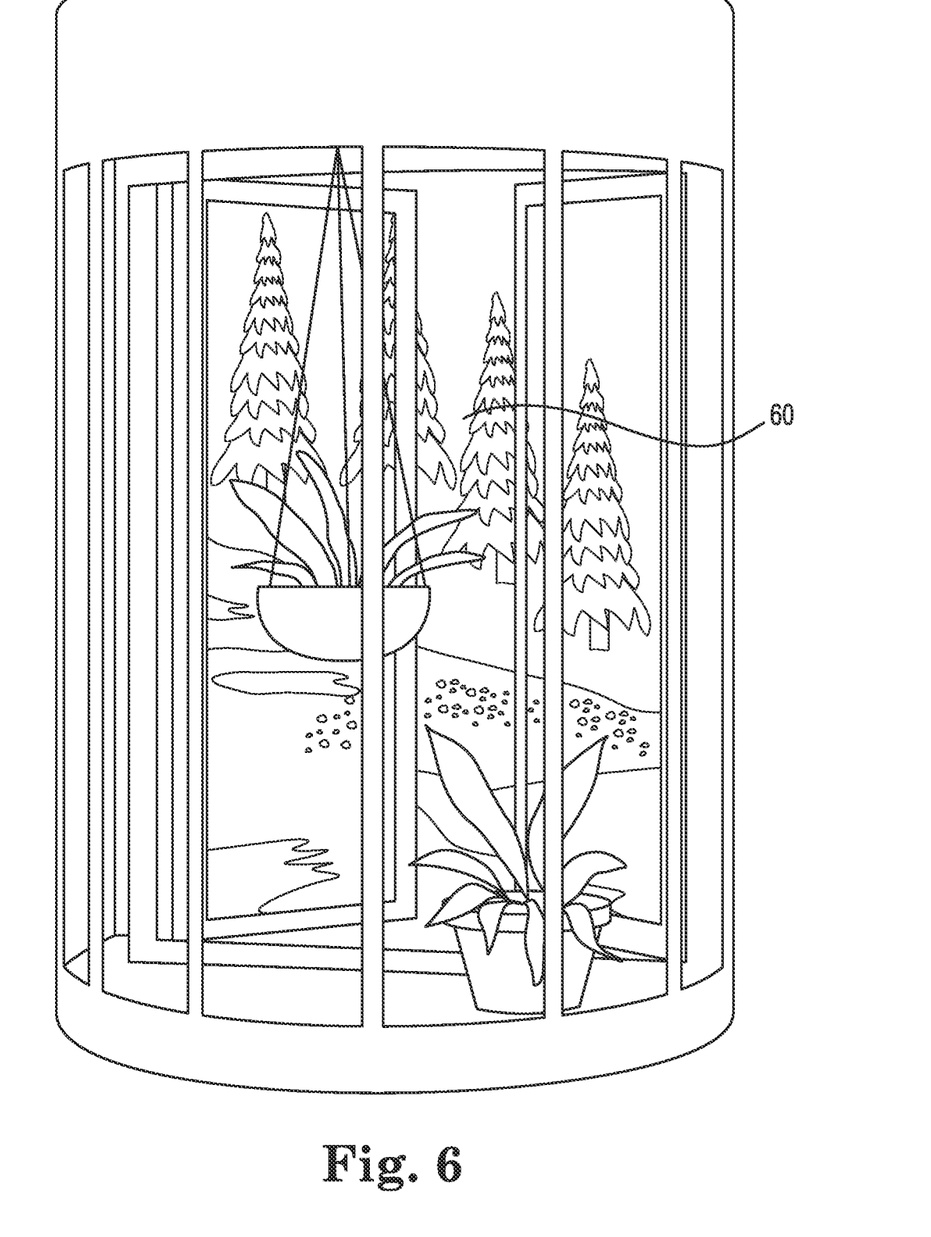
FIG. 6 is a front view of an embodiment of the virtual window with a 3D object and a digital image of an object overlaid on a digital image of a digital image scene.

FIG. 6 is a front view of an embodiment of the virtual window with a 3D object and a digital image of an object overlaid on a digital image of a digital image scene. It is the same embodiment as that shown in FIG. 5 except digital image sequence 60 also displays a daylight water scene. The window trim around monitor 20 is real, but the open windows going into the scene are digitally produced.

Our virtual window system may also include additional elements to simulate an actual window in a calming manner. These elements include the addition of aromatic elements that convey smells to elicit calming mental states. In some embodiments, the aromatic elements are coordinated with the digital image sequences to convey a more believable impression of an actual window in a calming manner. Other elements include, for example, those that create a wind effect, sound effects, and temperature effects.

The method aspect of our invention is inducing calming feelings in an occupant of a windowless room. The method comprises two steps. The first step is providing a virtual window system on a wall in a room without windows. The virtual window system comprises a processor, a computer-readable storage medium, a monitor, and a frame. The processor is a conventional device for controlling information and lighting to achieve specified results. The computer-readable storage medium is in communication with the processor and configured to transmit a digital image sequence to the monitor. The monitor is in communication with the computer-readable storage medium and the processor, and configured to display the digital image sequence. The frame surrounds the monitor, with a back, and includes at least one light source configured to transmit light into an indoor environment to simulate an actual window. Each of these element have been describes above. The second step is displaying the digital image sequence having scenes of a topic consisting of at least a nature scene depicting water or a nature scene depicting vegetation.

In one embodiment of the method of inducing calming feelings in an occupant of a windowless room, the virtual window system that is provided further comprises two more features to incorporate 3D elements. The first is at least part of a real 3D element that is in communication with at least part of the monitor. The second is that the computer-readable storage medium is configured to play a digital image sequence that incorporates a background scene and at least one foreground element that is a digitized element that is coordinated with the real 3D element.

In one embodiment of the method of inducing calming feelings in an occupant of a windowless room, the digital image sequence is further defined. The digital image sequence is a moving digital image and the digital image comprises a nature scene from a group consisting of trees with moving leaves or branches, moving water, gently moving vegetation, or savannahs.

Other modifications and changes regarding my invention will be apparent to those skilled in the art. The invention is not considered limited to the embodiments chosen for purposes of disclosure and covers all changes and modifications that do not constitute departures from the true spirit and scope of this invention.

We claim:

1. A virtual window system, comprising:
   a processor that is a conventional device for controlling information and lighting to achieve specified results;
   a computer-readable storage medium in communication with the processor and configured to transmit a digital image sequence to the monitor;
   a monitor in communication with the computer-readable storage medium and the processor, and configured to display the digital image sequence; and
   a frame surrounding the monitor, with a back, and including at least one light source configured to transmit light into an indoor environment to simulate an actual window, further comprising, at least part of a real 3D element in communication with at least part of the monitor, wherein the computer-readable storage medium is configured to play a digital image sequence that incorporates a background scene and at least one foreground element that is a digitized element that is coordinated with the real 3D element.

2. The virtual window system of claim 1 wherein the background scene is the same image or a series of varying images.

3. The virtual window system of claim 1 wherein the 3D element is trim on the outside of the monitor and the digital element is selected from a group consisting of an open window, a railing, shutters, and a separate partial 3D object.

4. A virtual window system, comprising:
   a processor that is a conventional device for controlling information and lighting to achieve specified results;
   a computer-readable storage medium in communication with the processor and configured to transmit a digital image sequence to the monitor;
   a monitor in communication with the computer-readable storage medium and the processor, and configured to display the digital image sequence; and
   a frame surrounding the monitor, with a back, and including at least one light source configured to transmit light into an indoor environment to simulate an actual window, further comprising, at least one curtain,
   wherein the configured light source comprises light shining inward through at least one curtain onto a wall and then reflected from the wall out into the environment.

5. A virtual window system, comprising:
   a processor that is a conventional device for controlling information and lighting to achieve specified results;
   a computer-readable storage medium in communication with the processor and configured to transmit a digital image sequence to the monitor;
   a monitor in communication with the computer-readable storage medium and the processor, and configured to display the digital image sequence; and
   a frame surrounding the monitor, with a back, and including at least one light source configured to transmit light into an indoor environment to simulate an actual window,
   wherein the configured light source comprises at least one light source that can move and at least one multi-faceted lens or aperture configured to move to create the appearance of sunlight on wind-blown leaves, or bouncing off of waves on water.

6. A virtual window system, comprising:
   a processor that is a conventional device for controlling information and lighting to achieve specified results;
   a computer-readable storage medium in communication with the processor and configured to transmit a digital image sequence to the monitor;
   a monitor in communication with the computer-readable storage medium and the processor, and configured to display the digital image sequence; and
   a frame surrounding the monitor, with a back, and including at least one light source configured to transmit light into an indoor environment to simulate an actual window,
   wherein the back of the frame comprises a pliable surface that is able to intimately conform to a contoured surface.

7. A virtual window system, comprising:
   a processor that is a conventional device for controlling information and lighting to achieve specified results;
   a computer-readable storage medium in communication with the processor and configured to transmit a digital image sequence to the monitor;
   a monitor in communication with the computer-readable storage medium and the processor, and configured to display the digital image sequence; and
   a frame surrounding the monitor, with a back, and including at least one light source configured to transmit light into an indoor environment to simulate an actual window,
   wherein the image also comprises an image of an open window superimposed over the digital image sequence.

8. A method of inducing calming feelings in a person in a windowless room, comprising:

providing a virtual window system on a wall in a room without windows, comprising:
- a processor that is a conventional device for controlling information and lighting to achieve specified results;
- a computer-readable storage medium in communication with the processor and configured to transmit a digital image sequence to the monitor;
- a monitor in communication with the computer-readable storage medium and the processor, and configured to display the digital image sequence; and
- a frame surrounding the monitor, with a back, and including at least one light source configured to transmit light into an indoor environment to simulate an actual window; and displaying a digital image sequence having at least one scene consisting of at least a nature scene depicting moving water or a nature scene depicting vegetation wherein the virtual window system further comprises at least part of a real 3D element in communication with at least part of the monitor, wherein the computer-readable storage medium is configured to play a digital image sequence that incorporates a background scene and at least one foreground element that is a digitized element that is coordinated with the real 3D element.

* * * * *